United States Patent
DeGood et al.

(10) Patent No.: US 6,186,159 B1
(45) Date of Patent: Feb. 13, 2001

(54) RUPTURE DISK CONTROLLED HYDRAULICALLY ACTUATED VALVE ASSEMBLY

(75) Inventors: Robert L. DeGood, Oak Grove; James O. Hinrichs, Odessa, both of MO (US)

(73) Assignee: Fike Corporation, Blue Springs, MO (US)

( * ) Notice: Under 35 U.S.C. 154(b), the term of this patent shall be extended for 0 days.

(21) Appl. No.: 09/320,787

(22) Filed: May 27, 1999

(51) Int. Cl.$^7$ ................................................. F16K 17/40
(52) U.S. Cl. ........................ 137/68.27; 137/70; 137/467
(58) Field of Search ........................ 137/68.23, 68.27, 137/70, 71, 467; 220/89.2

(56) References Cited

U.S. PATENT DOCUMENTS

| | | | |
|---|---|---|---|
| 1,311,774 | * 7/1919 | Ritter | 137/70 |
| 2,707,479 | * 5/1955 | Thomann et al. | 137/70 |
| 2,710,014 | * 6/1955 | Hayes | 137/70 |
| 2,912,992 | * 11/1959 | Gasche et al. | 137/70 |
| 2,954,041 | * 9/1960 | Gasche et al. | 137/70 |
| 3,484,817 | * 12/1969 | Wood | 220/89.2 |
| 3,603,333 | * 9/1971 | Anderson | 137/70 |
| 3,810,484 | * 5/1974 | Martini | 137/70 |
| 4,240,458 | 12/1980 | Huff . | |
| 4,953,579 | 9/1990 | Phillips et al. . | |
| 5,012,834 | * 5/1991 | Taylor | 137/70 |
| 5,154,202 | * 10/1992 | Hibler, Jr. et al. | 137/68.27 |
| 5,165,439 | * 11/1992 | Krynicki | 137/1 |

FOREIGN PATENT DOCUMENTS

| | | |
|---|---|---|
| 96202433 | 3/1997 | (EP) . |
| 2224692 | 10/1974 | (FR) . |

* cited by examiner

Primary Examiner—John Rivell
(74) Attorney, Agent, or Firm—Hovey, Williams, Timmons & Collins

(57) ABSTRACT

A pressure responsive valve assembly is disclosed as having a frangible burst disk that largely controls actuation of the valve. The valve assembly includes a housing having an inlet and an outlet and a valve seat therein. An actuating unit includes a collapsible fluid chamber and a moveable pressure responsive valve member. The valve member is engageable with the valve seat, positioned to experience the pressure conditions at the inlet, and operably coupled with the mechanism to cause collapsing of the fluid chamber when the valve member moves relative to the valve seat to establish or close communication between the inlet and outlet. The rupture disk normally blocks fluid flow from the chamber and thereby prevents collapsing of the chamber and corresponding movement of the valve member until the valve member experiences a predetermined maximum pressure at the inlet. When the overpressure is sensed at the inlet, the valve member moves relative to the valve seat and causes the disk to rupture and the fluid chamber to collapse. The valve assembly is particularly useful in bypass arrangements, wherein the valve assembly is arranged to relieve pressure in a primary line caused by failure of a primary valve. A new rupture disk assembly for use in the valve assembly is also disclosed.

39 Claims, 5 Drawing Sheets

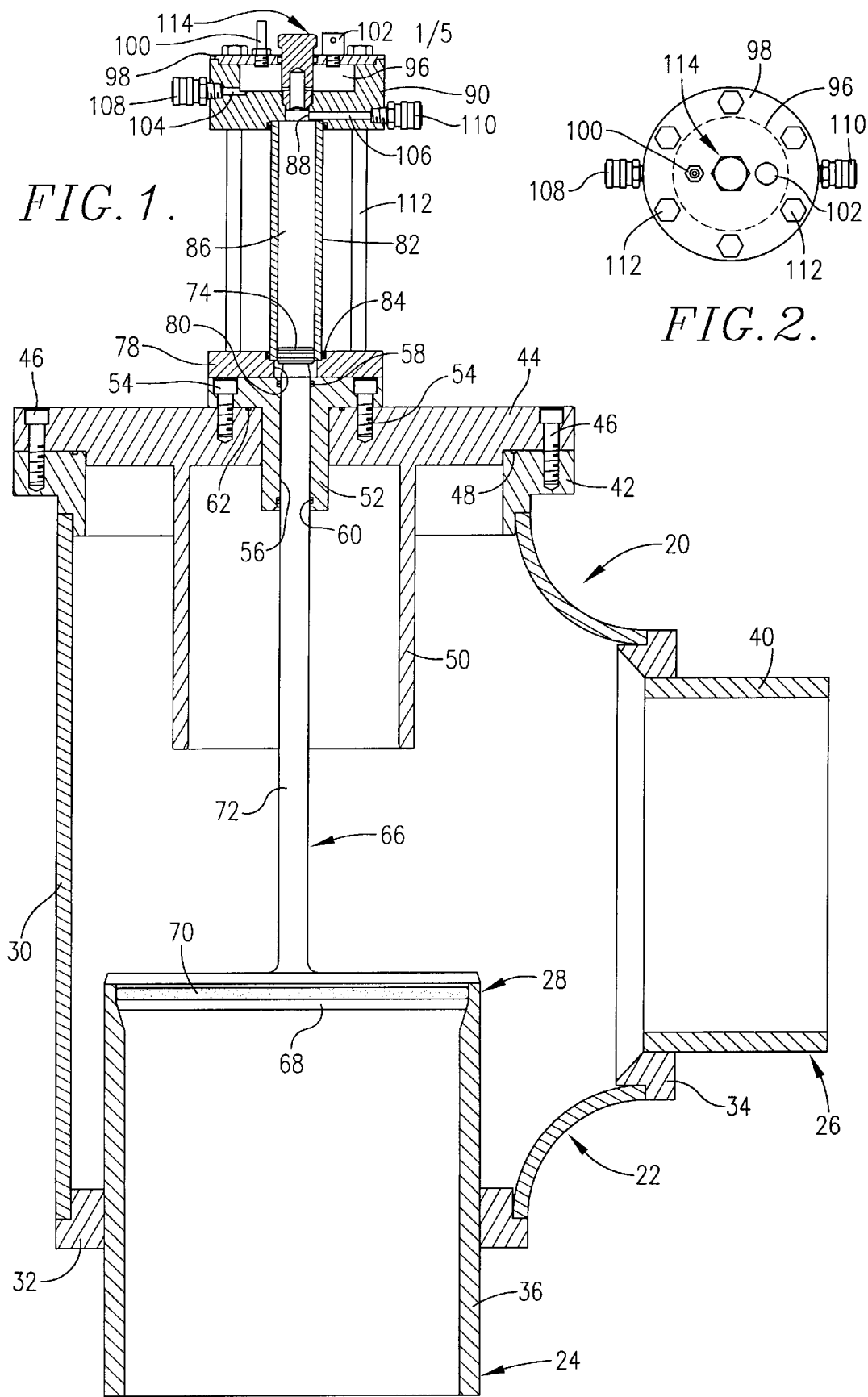

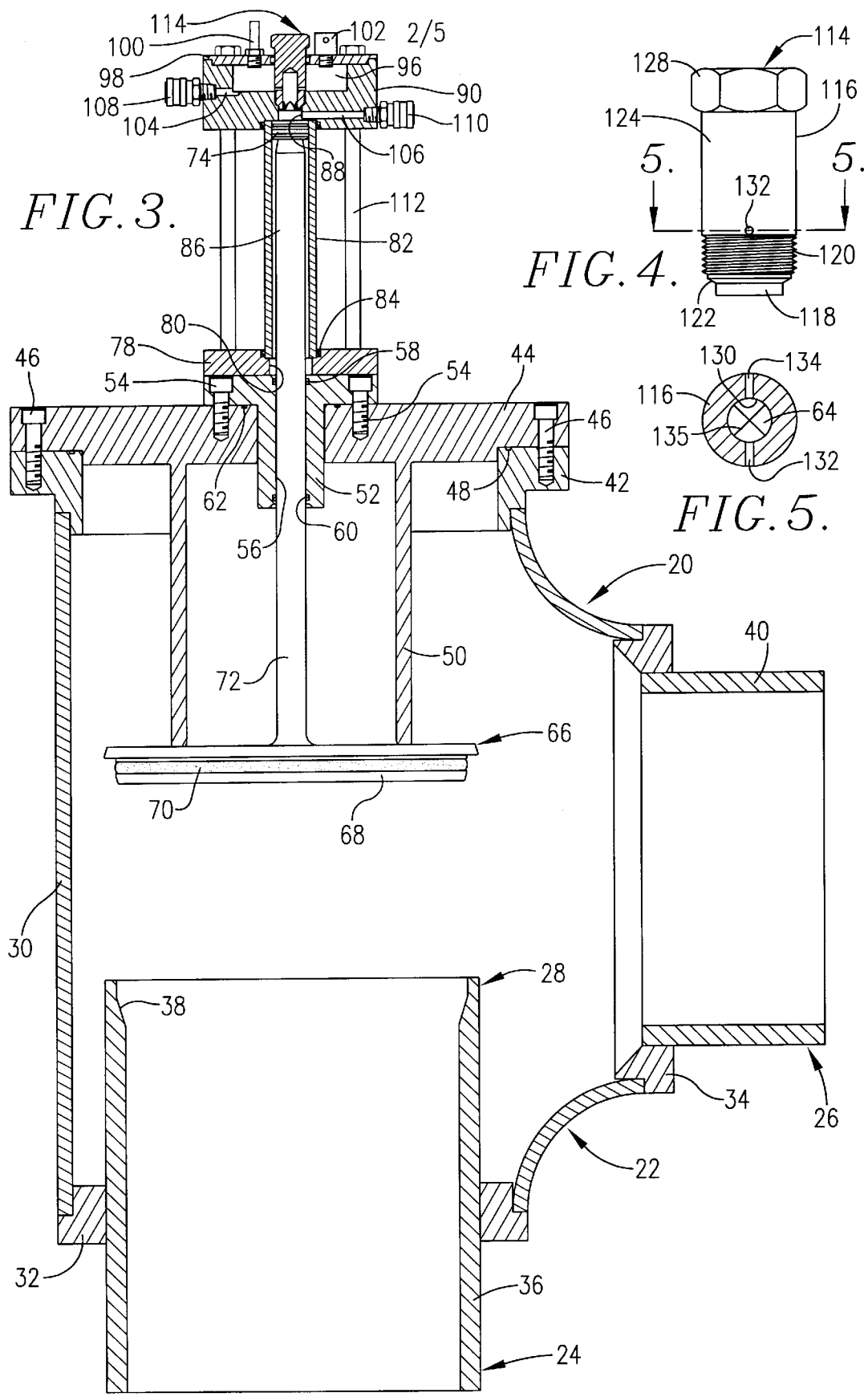

RUPTURE DISK CONTROLLED HYDRAULICALLY ACTUATED VALVE ASSEMBLY

BACKGROUND OF THE INVENTION

1. Field of the Invention

The present invention relates generally to pressure responsive valve assemblies which may be of the pressure relief or shutdown type. More particularly, the present invention concerns pressure responsive valves that are equipped with a rupture disk and a pressure-actuated unit which serves to both actuate the valve and to rupture the disk when the preselected valve set point pressure is exceeded. The valve assembly is particularly suitable for use in a bypass arrangement. The present invention also concerns a rupture disk apparatus for use in the valve assembly.

2. Discussion of Prior Art

Those ordinarily skilled in the art will appreciate that conventional pressure responsive valve assemblies present numerous problems. Particularly, pressure responsive valves tend to be expensive and, in some instances (e.g., inline rupture disks), large and unwieldy. Several conventional pressure responsive valves utilize structure for controlling valve actuation that essentially makes it impractical to use a single valve design for various set pressures. That is to say, a number of conventional valve designs require considerable modification to reconfigure the valve for actuation at different set pressure points. Some conventional valve designs present the risk of spillage and consequent plant contamination, particularly when replacement or reclosure of the valve requires disassembly of the piping to which the valve is connected. There are also concerns that some traditional valve actuating units provide only partial, incomplete valve actuation and that such actuation is probably insufficient to allow rapid and complete venting of the protected conduit or the like. These and other problems are identified in our copending application for U.S. Pat. Ser. No. 09/276,426, filed Mar. 25, 1999, entitled RUPTURE DISK CONTROLLED MECHANICALLY ACTUATED PRESSURE RELIEF VALVE ASSEMBLY, assigned of record to the assignee of the present invention.

Our prior application is directed to a valve assembly design that utilizes a rupture disk to control valve actuation. This arrangement permits the use of a small, easily replaceable rupture disk that can be manufactured to achieve relatively precise, reliable pressure set points for the valves over a wide range of set points and valve sizes. However, our prior application focused on the use of a mechanical actuating unit that contacted and caused the disk to rupture when the valve member experienced an elevation in pressure beyond the predetermined set pressure. In this respect, although the mechanically actuated valve design disclosed in our prior application addresses virtually every one of the problems associated with conventional pressure responsive valves, it has been determined that this design presents a few practical limitations.

OBJECTS AND SUMMARY OF THE INVENTION

Responsive to these and other problems, an important object of the present invention is to provide a rupture disk controlled pressure responsive valve assembly that addresses the problems normally associated with conventional pressure responsive valves. Another important object of the present invention is to provide a rupture disk controlled pressure responsive valve assembly that is operable at extremely high set pressures. It is also an important object of the present invention to provide a rupture disk controlled pressure relief valve assembly that can be quickly and relatively effortlessly reclosed after disk rupture, even when there is a substantial restrictive force against such reclosure. Yet another object of the present invention is to provide a pressure responsive valve design that utilizes a single rupture disk configuration to control a wide range of set pressures, such that the same rupture disk configuration may be used on a wide range of valve sizes and configurations.

In accordance with these and other objects evident from the following description of the preferred embodiment, the present invention concerns a rupture disktype pressure responsive valve assembly (either of the relief or shutdown variety) which can be used in a variety of contexts and may be easily repaired or retrofitted in the field without the need for extensive dismantling of associated piping or the like. Generally speaking, the inventive rupture disk controlled pressure responsive valve assembly includes a housing having an inlet and an outlet and a valve seat therein. An actuating unit includes a mechanism for defining a collapsible fluid chamber. The unit also includes a moveable pressure responsive valve member that is engageable with the valve seat, positioned to experience the pressure conditions at the inlet, and operably coupled to the mechanism to cause collapsing of the fluid chamber when the valve member moves relative to the valve seat to establish or close communication between the inlet and outlet. The rupture disk is associated with the mechanism to prevent collapsing of the chamber and corresponding movement of the valve member until the valve member experiences a predetermined maximum pressure at the inlet, whereupon the valve member moves relative to the valve seat and causes the disk to rupture and the fluid chamber to collapse.

The rupture disk is preferably connected to the fluid chamber opening so that fluid exiting the chamber impinges against the disk and eventually causes bursting of the disk once the maximum pressure is experienced by the valve member. It is believed that the use of fluid pressure (preferably hydraulic pressure) to burst the disk provides reliability and set pressure capabilities that have heretofore been unavailable. Those ordinarily skilled in the art will appreciate that rupture disks are traditionally designed for use in fluid conditions. It is believed that the natural environment provided by the present invention consequently yields relatively greater predictability and higher set pressures. This is likely attributable to, among other things, the fact that the fluid pressure is distributed evenly across the exposed face of the disk, as opposed to being a concentrated axial force.

The mechanism for defining the fluid chamber preferably comprises a cylinder and an internal, slidable piston. The size of the cylinder and piston may be adjusted relative to the valve member so as to vary the hydraulic pressure experienced by the rupture disk. In this respect, a single standard rupture disk configuration may be used for virtually any valve design and valve size.

The actuating unit is preferably provided with a fluid line providing selective access to the fluid chamber. Once the valve is actuated to rupture the disk, the disk may be replaced and pressurized fluid may then be supplied to the fluid chamber via the line. This will cause expansion of the chamber and eventually complete return of the valve member to its initial position. In the case of a pressure relief valve, this arrangement permits virtually effortless valve reclosure even when there is a restrictive force inhibiting such reclosure (e.g., when fluid continues to flow through the valve during reclosure).

The present invention also concerns the use of the valve assembly in a bypass arrangement and a rupture disk apparatus for use in the valve assembly.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a vertical sectional view of a pressure responsive relief valve assembly constructed in accordance with the principles of the present invention, particularly illustrating the valve member in the closed position to block communication between the inlet and outlet;

FIG. 2 is a top plan view of the valve assembly, with the valve housing being removed;

FIG. 3 is a vertical sectional view of the valve assembly similar to FIG. 1, but illustrating the valve member shifted away from the valve seat so as to establish communication between the inlet and outlet, with the fluid chamber being collapsed and the disk being ruptured;

FIG. 4 is a side elevational view of the replaceable rupture disk apparatus constructed in accordance with the principles of the present invention and used in the valve assembly shown in FIG. 1;

FIG. 5 is a horizontal cross-sectional view taken along line 5—5 of FIG. 4, particularly illustrating the diametrically opposed fluid passageways projecting outwardly from the bore and the intersecting score lines on the convex face of the rupture disk;

DETAILED DESCRIPTION OF THE PREFERRED EMBODIMENTS

Figure 8:
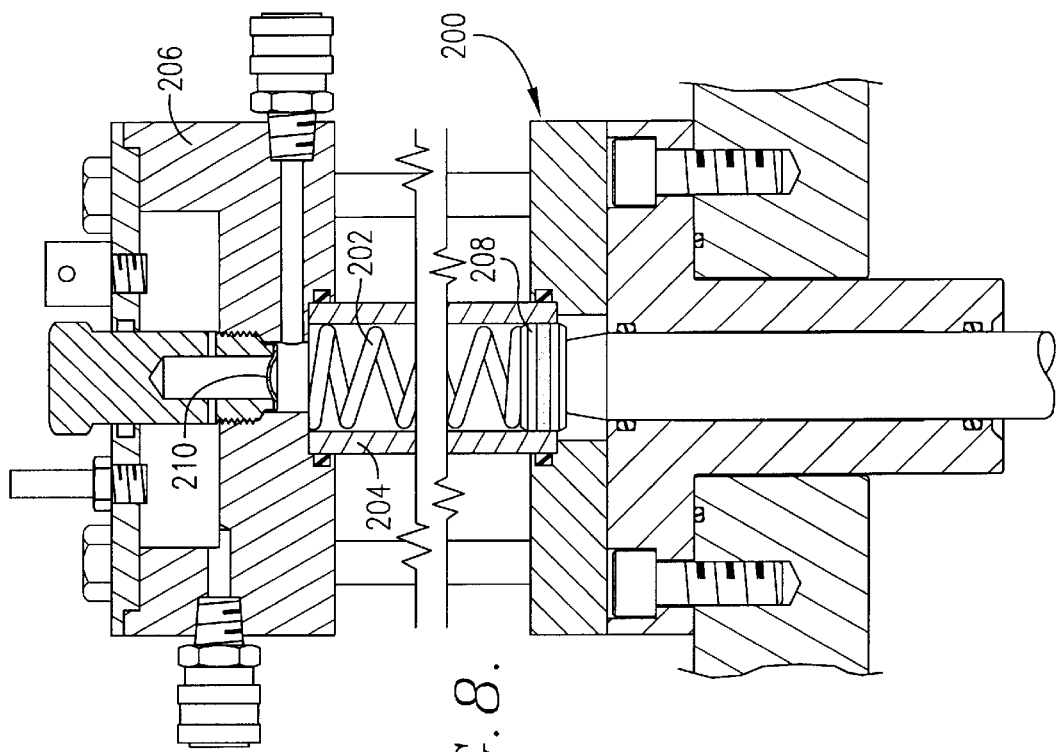
FIG. 8 is a fragmentary vertical sectional view of a second embodiment of the present invention, wherein the valve assembly is provided with a compression spring for biasing the valve member to its initial position prior to disk rupture.

Turning initially to FIGS. 1 and 3, the valve assembly 20 selected for illustration is designed to provide pressure relief and thereby permit fluid flow therethrough once a predetermined set point pressure is exceeded. The valve assembly 20 broadly includes a chamber defining a housing 22 having an inlet 24, an outlet 26 and a valve seat 28. It is noted that the housing 22 is generally similar in construction to the valve housing disclosed in our prior, which is identified above and hereby incorporated by reference to facilitate a complete understanding of the present invention.

It shall therefore be sufficient to explain that the housing 22 is essentially a hollow body having a primary wall 30 with end caps 32 and 34. As shown, the cap 32 supports an elongated, tubular inlet pipe 36 that defines the inlet 24 and is connectable to a process pipe. The inboard end of the inlet pipe 36 within the confines of the housing 22 has an inner surface 38 (see FIG. 3) defining the valve seat 28. The end cap 34 similarly supports a tubular outlet pipe 40 that defines the valve outlet 26 and communicates with the interior of the housing 22. The outlet pipe 40 is also connectable to a process pipe. The upper end of the housing 22 remote from the end cap 32 has an annular mounting block 42 affixed thereto. An apertured plate 44 is fastened to the mounting block 42 by threaded screws 46 and serves to close off the upper end of the housing 22. A circumferential O-ring 48 provides a positive seal between the block 42 and plate 44. Projecting inwardly from the underside of the plate 44 is a stop wall 50, for purposes which will subsequently be described.

An elongated, tubular bonnet 52 is secured to the plate 44 by screws 54 and presents an elongated, central, rod-receiving passageway 56. The passageway 56 is equipped with two O-rings 58 and 60. A circumferential O-ring 62 is also provided at the interface defined between the top face of the plate 44 and the underside of the bonnet 52.

The valve assembly 20 further includes a rupture disk 64 and a pressure responsive actuating unit 66 which operates when the valve set point pressure is exceeded to communicate the inlet 24 and outlet 26 and burst the disk 64. As will be described below, the illustrated actuating unit 66 utilizes hydraulic pressure to cause disk rupture.

Turning first to the actuating unit 66, a piston 68 is provided for seating within the valve seat 28 and thereby blocking fluid flow between the inlet 24 and outlet 26. The piston 68 is configured to conform with the surface 38 as shown, and has an O-ring seal 70 which sealingly engages the surface 38. An elongated valve stem or actuator rod 72 is secured to the piston 68 and extends through passageway 56 to project upwardly beyond the bonnet 52. At the upper end of the rod 72 is a second piston 74 that is relatively smaller than the valve piston 68, such that the upper exposed surface area of the piston 74 is significantly less than the lower exposed surface area of the valve piston 68. The second piston 74 is preferably circular in cross-sectional shape and is provided with an O-ring seal 76 extending about its circumference (e.g., see FIG. 7). The actuator rod 72 consequently interconnects and causes corresponding movement of the pistons 68 and 74. Moreover, the pressure experienced by one of the pistons is necessarily translated to the other.

The actuating unit 66 further includes an apertured mounting disk 78 that is supported on the bonnet 52 and presents a central rod-receiving opening 80 through which the actuator rod 72 projects. A hollow cylinder 82 is located in axial alignment with the actuator rod 72 and is fit within an uppermost stepped shoulder defined about the central opening 80 of the disk 78, with an O-ring seal 84 also being provided in the shoulder area of the opening 80 between the disk 78 and cylinder 82. The cylinder 82 presents a circular cross-sectional shape and an inner diameter to match the diameter of the piston 74, such that the piston 74 is slidable within the cylinder 82 yet sealing contact is provided therebetween. In this respect, the piston 74 and cylinder 82 cooperatively define a collapsible and expandable fluid chamber 86 that is located above the piston 74. The upper end of the cylinder 82 defines a chamber opening 88 through which fluid flows as the chamber volume changes. It is, however, entirely within the ambit of the present invention to utilize various other structure for defining the fluid chamber (e.g., a bladder connected to the actuator rod 72) or to modify the cylinder and piston shape (e.g., a cylinder and piston having a rectangular crosssectional shape may be used). The chamber 86 is preferably filled with liquid, such as hydraulic fluid, although a compressible gas may be used.

Figure 6:
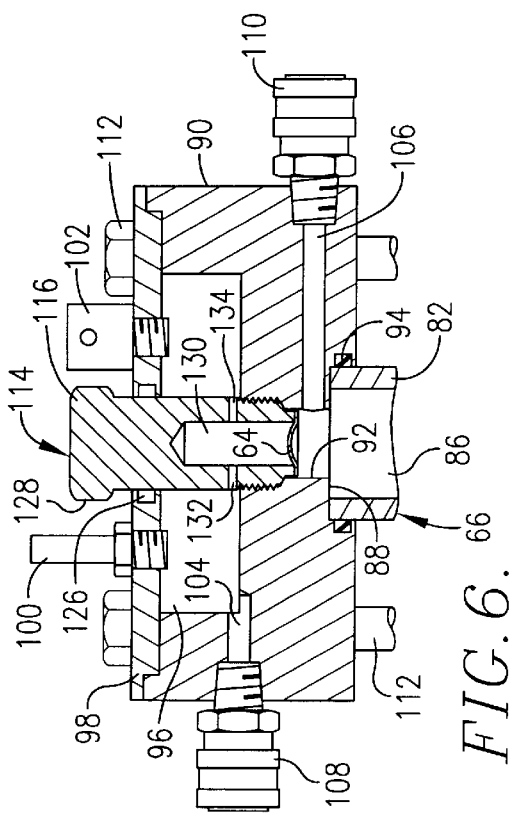
FIG. 6 is an enlarged, fragmentary vertical sectional view of the upper end of the valve assembly, particularly illustrating the structure for defining the relief chamber, the first and second fluid lines providing selective access to the respective fluid and relief chambers, and the rupture disk before valve actuation.
Figure 7:
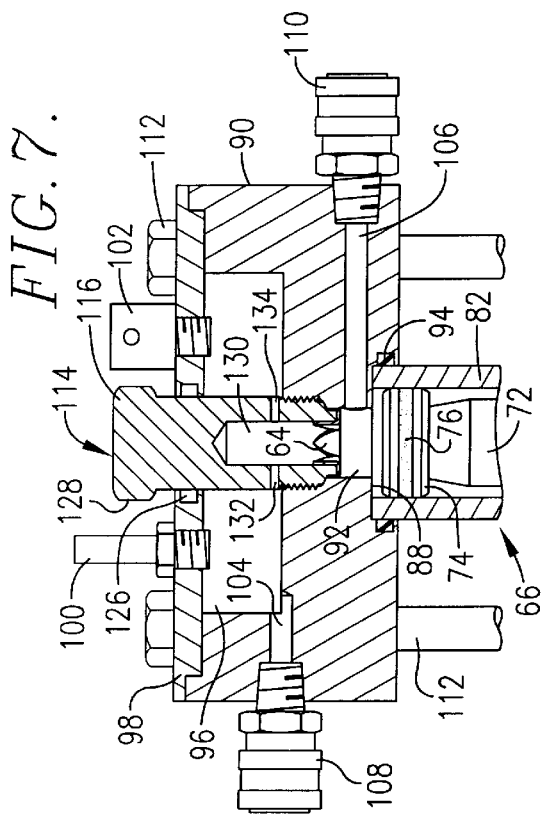
FIG. 7 is an enlarged, fragmentary vertical sectional view of the upper end of the valve assembly similar to FIG. 6, but illustrating the disk after it has been ruptured.

At the upper end of the cylinder 82 is a cylindrically-shaped block 90 that presents a central, lower conduit 92 extending from the chamber opening 88, as perhaps best shown in FIGS. 6 and 7. In generally the same manner as its lower end, the upper end of the cylinder 82 is fit within a shoulder defined about the conduit 92, and an O-ring seal 94 is provided between the cylinder 82 and block 90. For purposes which will subsequently be described, the upper portion of the conduit 92 has an increased diameter relative to the lower portion and is provided with internal threads. A relief chamber 96 is defined in the block 90 between the conduit 92 and the stepped upper margin of the block 90. The relief chamber 96 presents a volume that is at least equal to, but preferably greater than, the volume of the fluid chamber 86. With the relief chamber 96 being larger than the fluid chamber 86, the former is preferably provided with a small reserve of fluid (when liquid is used).

The open top of the block 90 is covered by an apertured plate 98. Located along a common diametrical line extending across the cover plate 90 are a so called "schrader valve" 100 (e.g., similar to a valve stem used with most automobile tires) and a normally open vent valve 102 (see FIG. 2). The illustrated valves 100 and 102 threadably engage the cover plate 90 and, as will subsequently be described, provide selective communication with the relief chamber 96. The block 90 further includes a pair of upper and lower radial fluid lines 104 and 106, with the upper line 104 projecting from and thereby communicating with the relief chamber 96 and the lower line 106 projecting from the conduit 92 and thereby communicating with the fluid chamber 86. Each of the lines 104 and 106 is provided with a standard quick disconnect valve 108 and 110, respectively, which permit flow through the line only when the corresponding male connector is attached thereto.

In the illustrated embodiment, the assembly above the bonnet 52 (i.e., the mounting disk 78, the cylinder 82 and the block 90) is secured to the housing 22 by a plurality of externally threaded, long bolts 112 spaced about the circumference of the block 90 (e.g., see FIG. 2). The bolts 112 pass through the block 90 and the mounting disk 78 and are threadably received in internally threaded openings (not shown) defined in the bonnet 52. The set of bolts 112 may be variously tightened when the assembly is attached to the housing 22, and it is believed that this arrangement is capable of facilitating alignment of the cylinder 82 with the actuator rod 72 so as to reduce the risk of binding of the piston 74 within the cylinder 82.

It is particularly noted that the rupture disk 64 is located between the fluid chamber 86 and relief chamber 96 and thereby prevents flow out of the fluid chamber 86 until ruptured. In this respect, the disk 64 normally serves as a restriction against movement of the piston 74 and against corresponding unseating of the valve piston 68. However, once the disk 64 ruptures, fluid may flow to the relief chamber 96, which consequently permits collapsing of the fluid chamber 86 and movement of the valve piston 68 away from the valve seat 28.

The rupture disk 64 is preferably part of an apparatus 114 that is removably coupled to the block 90. The rupture disk apparatus 114 also includes an elongated, generally cylindrical body 116 that is axially aligned with the conduit 92 when the apparatus 114 is attached to the block 90 (see FIGS. 6–7). The body 116 presents a lower smooth tip 118 that is circular in cross-sectional shape and configured to fit snugly within the lower portion of the conduit 92 (see FIGS. 4 and 6–7). An externally threaded section 120 spaced from the tip 118 of the body 116 threadably engages the internally threaded portion of the conduit 92 when the apparatus 114 is attached to the block 90. The body includes a small chamfer 122 extending between the tip 118 and threaded section 120. As perhaps best shown in FIGS. 6 and 7, the tip 118, threaded section 120, and chamfer 122 cooperatively provide sealing engagement with the block 90. A generally smooth, circular outer surface 124 projects upwardly from the threaded section 120 and through the cover plate 98 when the apparatus 114 is attached to the block 90. An O-ring seal 126 is preferably provided between the cover plate 98 and smooth outer surface 124. A hexagonal shaped, oversized head 128 is defined adjacent the upper end of the body 116 so as to facilitate the threaded engagement and disengagement of the body 116 and block 90. A bore 130 projects upwardly from the lower end of the body 116. The bore 130 terminates short of the upper end of the body 16, but a pair of diametrically opposed fluid passageways 132 and 134 extending radially between the outer surface 124 and the bore 130 serve to expose the bore 130 at locations spaced above the threaded section 120 (e.g., see FIG. 5). As shown in FIGS. 6 and 7, the passageways 132 and 134 are at generally the same elevation as the relief chamber 96, and accordingly, the relief chamber 96 and the bore 130 freely intercommunicate via the passageways 132 and 134.

In the illustrated embodiment, the rupture disk 64 is securely attached by suitable means (e.g., welding or soldering) against the lower end of the body 116. Particularly, the illustrated disk 64 presents an outer, annular, flat flange and a concavo-convex burst area, with the former facilitating attachment of the disk 64 to the body 116 and the latter projecting slightly into the bore 130 (see FIGS. 6 and 7). Referring to FIG. 5, it will be observed that the convex face of the burst area is provided with a pair of intersecting score lines 135 which ensure more reliable operation of the disk 64. The disk 64 is preferably formed of metal, although various other materials may be used. The principles of the present invention are also equally applicable to various other disk configurations (e.g., a reverse buckling disk), as noted in our prior application.

In operation of the valve assembly 20, incoming pressurized fluid encounters the valve piston 68 and urges the piston 68 to move away from the valve seat 28. This is translated to the upper piston 74 by the actuator rod 72 and the fluid chamber 86 is consequently urged toward a collapsed condition. However, the rupture disk 64 blocks fluid flow from the chamber 86 and thereby prevents movement of the the upper piston 74 and valve piston 68 until the pressure in the fluid chamber 86 exceeds a relatively reliable, predictable amount (referred to herein as the predetermined burst pressure value of the disk 64). Because the pressure within the fluid chamber 86 is proportional to the pressure within the inlet 24, it may be said that the characteristics of the rupture disk 64 largely determine the set point pressure for the valve assembly 20. In any case, once the bias against the valve piston 68 causes the pressure within the fluid chamber 86 to exceed the predetermined burst value of the disk 64, the disk 64 will rupture (as shown in FIGS. 3 and 7) and fluid will consequently be permitted to flow out of the chamber 86 through the opening 88, into the conduit 92, pass the ruptured disk 64, into the bore 130, through the passageways 132 and 134 and into the relief chamber 96 (note, the normally open vent valve 102 permits air to escape from the relief chamber 96 as it fills with fluid). Thus, rupturing of the disk 64 allows the fluid chamber 86 to collapse and thereby permits movement of the pistons 68 and 74. The valve piston 68 will eventually unseat from the surface 38 and allow fluid to flow between the inlet 24 and outlet 26. Moreover, because movement of the valve piston 68 is no longer prevented, the piston 68 will shift away from the valve seat 28 until it engages the stop wall 50. This ensures that full and complete communication will be established between the inlet and outlet when the disk 64 is ruptured. It is noted that the fluid passageways 132 and 134 permit only limited fluid flow therethrough and therefore serve to reduce the risk of damaging impact as the valve piston 68 engages the stop wall 50. If necessary, the cross-sectional size of the fluid passageways 132 and 134 may be changed to provide different rates of deceleration for the valve piston 68.

It is noted that the illustrated fluid chamber 86 has a smaller cross-sectional area than the cross-sectional area of the inlet 24, and there is consequently a step up in pressure from the inlet 24 to the fluid chamber 86. In other words, the pressure within the fluid chamber 86 is greater than the pressure in the inlet 24. However, the illustrated arrangement is still capable of providing extremely high and predictable set pressure points. It is believed that this is primarily attributable to the fact that the rupture disk 64 is being used in a fluid environment. In addition, it is possible in a given valve application to vary the set pressure simply by changing the size of the fluid chamber (e.g., by providing a different piston and cylinder size). Accordingly, a rupture disk of a given size and configuration may be used for a wide range of valve sizes and set pressures.

Replacement of the rupture disk 64 and resetting of the valve to the closed position is relatively effortless and easily accomplished. Assuming pressurized fluid flow to the inlet 24 has stopped so that there is virtually no restriction to reclosure of the valve, the vent valve 102 is preferably first closed. The relief chamber 96 is then pressurized by supplying pressurized air thereto via the schrader valve 100, whereby fluid is forced from the relief chamber 96, back through the ruptured disk 64 and into the fluid chamber 86. Expansion of the chamber 86 will consequently cause the pistons 68 and 74 to slide downwardly and eventually the valve piston 68 will sealingly engage the valve seat 28. If desired, the valve housing 22 may be provided with a window that permits visual inspection of the actuating unit 66 to ensure that the valve piston 68 is properly seated. Alternatively, a sensor may be provided to ensure that the pistons 68,74 and actuator rod 72 have sufficiently shifted to place the valve piston 68 in sealing contact with the valve seat 28. In any case, the rupture disk apparatus 114 is thereafter removed simply by unscrewing it from the block 90, and a new rupture disk apparatus may subsequently be installed. The vent valve 102 is reopened and the valve assembly 20 is again operational. In the illustrated embodiment, with the relief chamber 96 being larger than the fluid chamber 86 and having a small reserve of liquid contained therein, there is relatively no risk of trapping gas below the rupture disk 64 during its replacement and reclosure of the valve.

On the other hand, if there is something that might restrict expansion of the fluid chamber 86 during disk replacement and valve reclosure (e.g., fluid continues to flow through the valve housing 22), the rupture disk apparatus 114 is first removed from the block 90 and a new replacement apparatus is installed. Fluid is preferably then removed from the relief chamber 96 by applying a suction source to the upper fluid line 104. The removed fluid or new fluid is then pressurized and supplied to the fluid chamber 86 via the lower fluid line 106. This causes expansion of the fluid chamber 86 and eventually reclosure of the valve. If necessary, the lower fluid line 106 may be provided with a pressure gauge to reduce the risk of over-pressurization of the fluid chamber 86 and premature failure of the new rupture disk.

Figure 11:
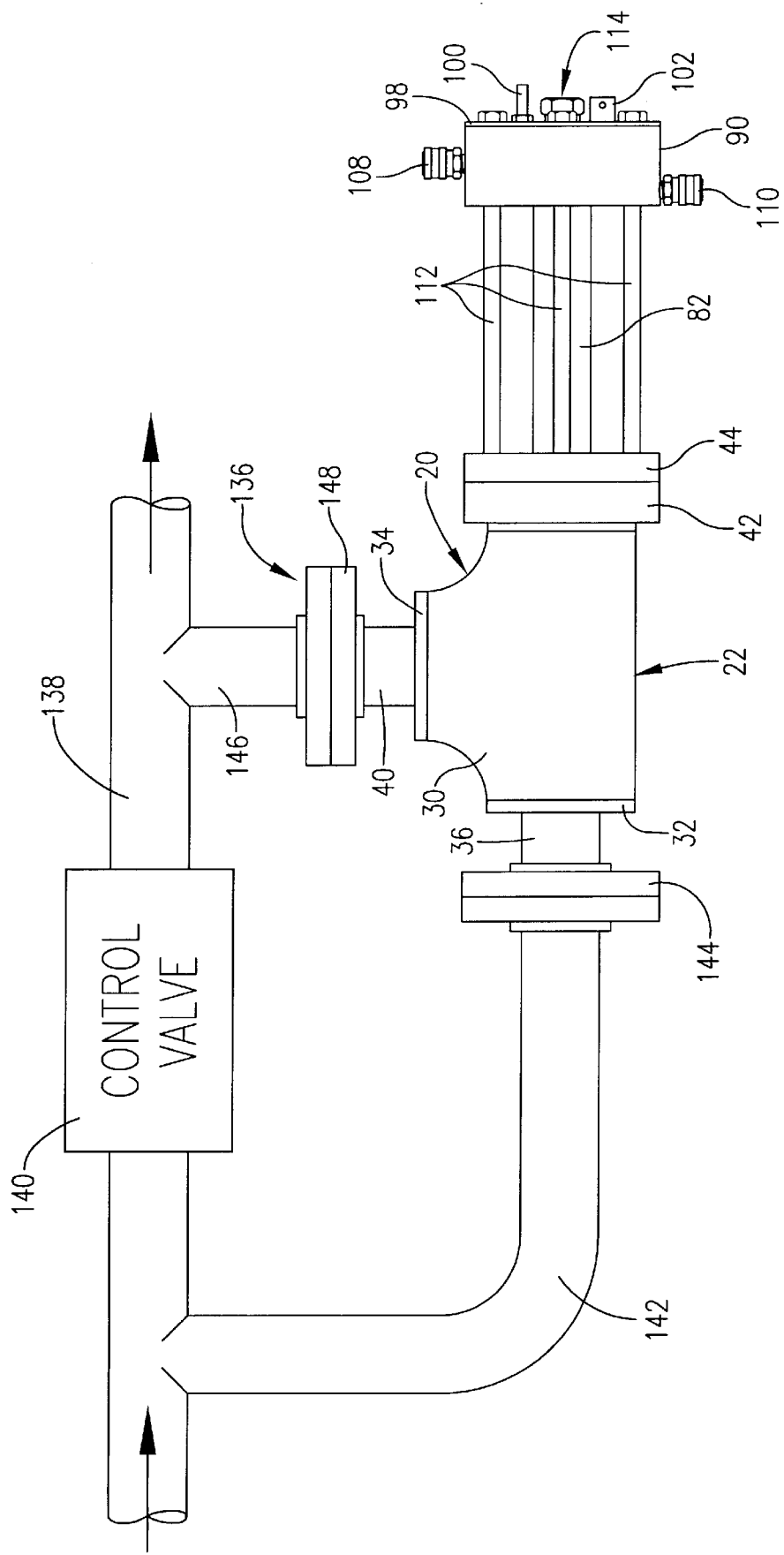
FIG. 11 is a schematic view illustrating the valve assembly shown in FIGS. 1–7 as part of a bypass assembly.

Referring to FIG. 11, a bypass assembly 136 employing the valve assembly 20 is illustrated. The bypass assembly 136 is used as a safety measure with a primary flow conduit 138 having a control valve 140 therein. Particularly, it will be observed that a bypass inlet pipe 142 leads from the primary conduit 138 upstream of the valve 140 to the inlet pipe 24 of the valve assembly 20 and is coupled thereto by a union 144. Similarly, a bypass outlet pipe 146 is connected to the outlet pipe 40 via a union 148, with the bypass outlet pipe 146 leading from the pipe 40 back to the primary conduit 138 downstream of the valve 140.

In the event of a control valve failure, fluid is delivered to the valve assembly 20 of the bypass assembly 136. When the valve assembly 20 actuates, the fluid is delivered via the pipes 40 and 146 back to the primary conduit 138. In the event of such a sequence, it is a simple matter to replace the disk 64 and reclose the valve assembly 20.

Figure 9:
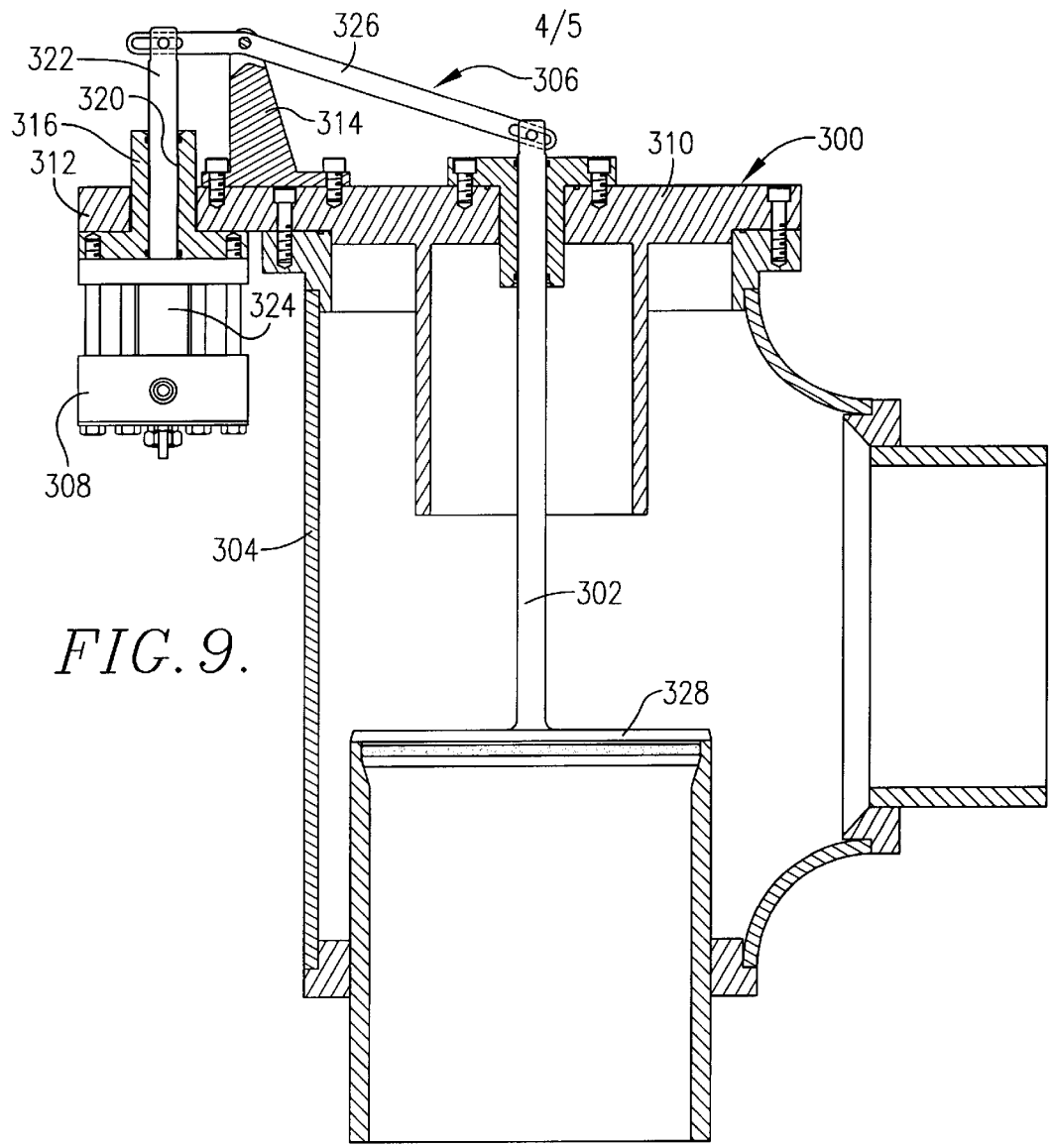
FIG. 9 is a vertical sectional view of a third embodiment of the present invention, wherein the fluid chamber and rupture disk are mounted astride the housing and the piston and valve member are operably intercoupled by a linkage outside the housing.

FIGS. 8 and 9 illustrate various other relief valve assembly embodiments constructed in accordance with the present invention. These embodiments employ many of the same basic components as the previously described valve assembly 20, and accordingly, the descriptions thereof will focus primarily on the distinctions.

Turning first to FIG. 8, the valve assembly 200 includes an elongated, compressible reclosure spring 202 located within the cylinder 204 and retained between the block 206 and the piston 208. The spring 202 assists in holding the valve in its closed position such that the spring pressure exerted on the piston 208 supplements the rupture disk 210 in providing the valve set pressure. Upon actuation of the assembly 200, the valve will be reclosed by the spring 202 when the pressure at the valve inlet (not shown) falls below the spring pressure. A valve of this design may be useful in applications where it is desired to limit the exposure of process fluids to the atmosphere after valve actuation, i.e., the valve serves to minimize pollution problems. Further, the spring 202 may be used to reduce the impact load when the valve piston (not shown) reaches the end of its travel proximal to the stop wall (also not shown).

The embodiment shown in FIG. 9 concerns a pressure relief valve assembly 300 having an actuator rod 302 that extends outside of the valve housing 304 and is coupled with an exterior linkage 306 permitting actuation of the rupture disk (not shown) mounted within the block 308 outside and astride of the housing 304. In detail, the apertured plate 310 has a lateral extension 312 which supports an upright pivot leg 314 as well as an apertured mounting block 316. The block 316 is secured to the underside of extension 312, and has a passageway 320. An elongated actuator rod 322 extends through the passageway 320 as shown and is equipped with a piston (not shown). The piston cooperates with the cylinder 324 to define a fluid chamber upstream from the rupture disk (not shown). A slotted crank arm 326 is operably coupled to the ends of the rods 302 and 322, and is pivotally supported by the leg 314. This design places the rupture disk (not shown) out of axial alignment with the valve piston 328 and rod 302. It will be appreciated that in this unit the pivot point for the arm 326 may be varied to achieve different levels of force multiplication at the piston supported on the rod 322. To this end, the arm may be straight, angled or of virtually any other desired configuration.

Figure 10:
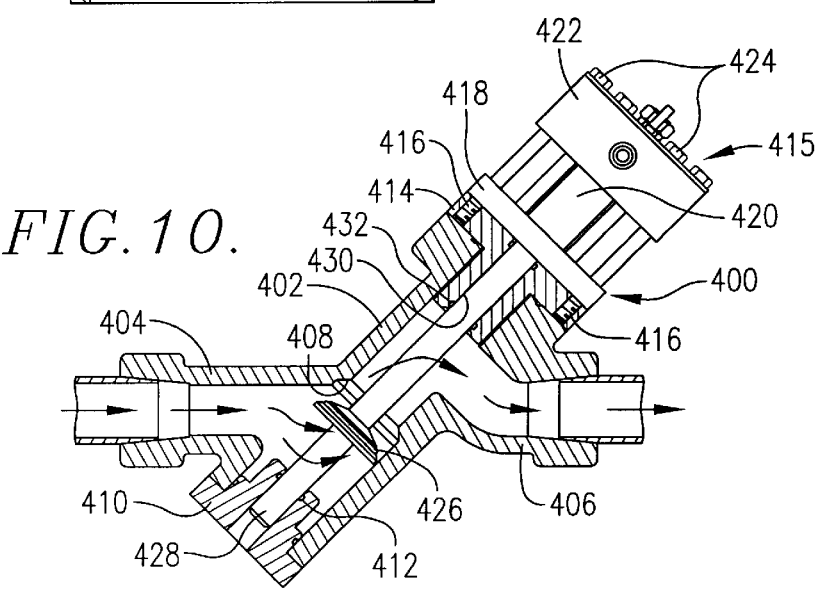
FIG. 10 is a vertical sectional view of a fourth embodiment of the present invention, wherein the valve assembly is a shutoff valve designed to close when the set pressure is experienced by the valve member.

Turning now to FIG. 10, a shutdown valve assembly 400 is shown. In this case, the assembly 400 has an elongated tubular chamber-defining housing 402 presenting an integral tubular inlet 404 and an integral tubular outlet 406. A valve seat 408 is formed within the housing 402 between the inlet and outlet. One end of the housing 402 has an annular plug 410 having an inner O-ring seal 412. The opposite end of the housing 402 has an annular bonnet 414 secured to the housing 402 by screws 416. Similar to the embodiment shown in FIGS. 1–7, the actuating unit 415 includes a mounting disk 418, a cylinder 420 and a block 422, all of which are secured to the bonnet 414 by bolts 424. In addition, the actuating unit 415 has a pressure responsive piston 426 mounted on an actuating rod 428. A passageway 430 provided with O-ring seals 432 is defined in the bonnet 414 and is configured to slidably receive the actuating rod 428, along with the plug 410. Although not shown, it will be appreciated that the actuating rod 428 is provided with a piston that cooperates with the cylinder 420 to define a fluid chamber upstream from the rupture disk mounted in the block 422.

In the assembly 400, the piston 426 is held at a precise off-seat position so as to establish a minor pressure drop across the piston during normal flow of fluid through the valve assembly 400. At the desired valve set point, the increased pressure drop generates an axial force serving to push the actuating rod 428 and thereby rupture the disk and collapse the fluid chamber defined within the cylinder 420. This allows the piston 426 to come into seating engagement with the valve seat 408 so as to close the valve and eliminate further fluid flow therethrough. This type of shutdown valve can be used in many applications such as in the tubes of tube and shell heat exchangers. If a tube ruptures, the valve assembly will close at an increased flow rate.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A pressure responsive valve assembly comprising:
   a housing having an inlet and an outlet and a valve seat therein;
   an actuating unit including a mechanism that defines a collapsible fluid chamber,
   said actuating unit including structure that defines a relief chamberfluidly connected to the fluid chamber, and a first fluid line providing selective access to the fluid chamber and a second fluid line providing selective access to the relief chamber,
   said actuating unit further including a moveable pressure responsive valve member that is engageable with the valve seat, positioned to experience the pressure conditions at the inlet, and operably coupled with the mechanism to cause collapsing of the fluid chamber when the valve member moves relative to the valve seat to establish or close communication between the inlet and outlet; and
   a rupture disk fluidly interposed between the fluid and relief chambers so that the disk blocks flow between the chambers until being ruptured and associated with the mechanism to prevent collapsing of the fluid chamber and corresponding movement of the valve member until the valve member experiences a predetermined maximum pressure at the inlet, whereupon the valve member moves relative to the valve seat and causes the disk to rupture and the fluid chamber to collapse.

2. A valve assembly as claimed in claim 1,
said inlet being tubular,
said valve seat being formed in the tubular inlet,
said valve member comprising a valve piston that can be located within the tubular inlet in engagement with the valve seat and is shiftable relative thereto.

3. A valve assembly as claimed in claim 1,
said rupture disk comprising a metallic, concavo-convex disk.

4. A valve assembly as claimed in claim 3,
said rupture disk presenting inner and outer faces, with at least one of the faces having a line of weakness formed therein.

5. A valve assembly as claimed in claim 4,
said line of weakness being a score line.

6. A valve assembly as claimed in claim 3,
said rupture disk presenting inner and outer faces, with at least one of the faces having a pair of intersecting lines of weakness formed therein.

7. A valve assembly as claimed in claim 1,
said assembly being a relief valve,
said valve member moving away from the valve seat and thereby communicating the inlet and outlet for pressure relief when the valve member experiences the predetermined maximum pressure.

8. A valve assembly as claimed in claim 1,
said assembly being a shutdown valve,
said valve member moving toward and into engagement with the valve seat to block communication between the inlet and outlet when the valve member experiences the predetermined maximum pressure.

9. A valve assembly as claimed in claim 1,
said mechanism including a cylinder and a piston slidable within the cylinder, with the piston and cylinder cooperatively defining the collapsible fluid chamber.

10. A valve assembly as claimed in claim 9,
said actuating unit including a rod extending between and interconnecting the piston and valve member.

11. A valve assembly as claimed in claim 10,
said valve member presenting a valve surface positioned to experience the pressure conditions at the inlet, and the piston presenting a piston surface positioned to experience the pressure conditions in the fluid chamber,
said valve surface having a greater area than the piston surface.

12. A valve assembly as claimed in claim 9,
said cylinder presenting a chamber opening through which fluid flows as the fluid chamber collapses,
said rupture disk being fluidly connected to the fluid chamber opening to block flow through the opening until the predetermined maximum pressure is experienced by the valve member.

13. A valve assembly as claimed in claim 1,
said rupture disk being replaceable.

14. A valve assembly as claimed in claim 1,
said fluid chamber containing a liquid.

15. A bypass assembly for bypassing a valve located within a primary conduit in the event of valve failure, said bypass assembly comprising:
a bypass valve comprising
a housing having an inlet and an outlet and a valve seat therein,
an actuating unit including
a mechanism that defines a collapsible fluid chamber, structure that defines a relief chamber fluidly connected to the fluid chamber, and
a first fluid line providing selective access to the fluid chamber and a second fluid line providing selective access to the relief chamber,
said actuating unit further including a moveable pressure responsive valve member positioned in engagement with the valve seat to normally block communication between the inlet and outlet and to experience the pressure conditions at the inlet, with the valve member being operably coupled with the mechanism to cause collapsing of the fluid chamber when the valve member moves relative to the valve seat for establishing communication between the inlet and outlet; and
a rupture disk fluidly interposed between the fluid and relief chambers so that the disk blocks flow between the chambers until being ruptured,
said rupture disk being associated with the mechanism to prevent collapsing of the fluid chamber and corresponding movement of the valve member until the valve member experiences a predetermined maximum pressure at the inlet, whereupon the valve member moves away from the valve seat an amount sufficient to communicate the inlet and outlet and causes the disk to rupture and the fluid chamber to collapse;
inlet and outlet conduits respectively in communication with the primary conduit on opposite sides of the primary conduit valve and the bypass valve inlet and outlet; and
a removable elongated body presenting opposite first and second ends,
said body including a bore that extends inwardly from the first end and is capable of communicating with the fluid chamber at least one fluid passageway that projects outwardly from the bore to fluidly intercommunicate the bore and relief chamber at a point spaced between the first and second ends, and an outer sealing surface that is configured to sealingly engage the structure between said point and the first end,
said rupture disk being fixed to the body adjacent the first end to block flow between the chambers until being ruptured.

16. A bypass assembly as claimed in claim 15,
said inlet being tubular,
said valve seat being formed in the tubular inlet,
said valve member comprising a valve piston that can be located within the tubular inlet in engagement with the valve seat and is shiftable relative thereto.

17. A bypass assembly as claimed in claim 15,
said rupture disk comprising a metallic, concavo-convex disk.

18. A bypass assembly as claimed in claim 17,
said rupture disk presenting inner and outer faces, with at least one of the faces having a line of weakness formed therein.

19. A bypass assembly as claimed in claim 18,
said line of weakness being a score line.

20. A bypass assembly as claimed in claim 17,
said rupture disk presenting inner and outer faces, with at least one of the faces having a pair of intersecting lines of weakness formed therein.

21. A bypass assembly as claimed in claim 20,
said mechanism including a cylinder and a piston slidable within the cylinder, with the piston and cylinder cooperatively defining the collapsible fluid chamber.

22. A bypass assembly as claimed in claim 21,
said actuating unit including a rod extending between and interconnecting the piston and valve member.

23. A bypass assembly as claimed in claim 22,
said valve member presenting a valve surface positioned to experience the pressure conditions at the inlet, and the piston presenting a piston surface positioned to experience the pressure conditions in the fluid chamber,
said valve surface having a greater area than the piston surface.

24. A bypass assembly as claimed in claim 21,
said cylinder presenting a chamber opening through which fluid flows as the fluid chamber collapses,
said rupture disk being fluidly connected to the fluid chamber opening to block flow through the opening until the predetermined maximum pressure is experienced by the valve member.

25. A bypass assembly as claimed in claim 15,
said rupture disk being replaceable.

26. A bypass assembly as claimed in claim 15,
said fluid chamber containing a liquid.

27. A rupture disk apparatus for use in a pressure responsive valve assembly having a collapsible fluid chamber that collapses when the valve is actuated, said apparatus comprising:
an elongated body presenting opposite first and second ends,
said body including a bore that extends inwardly from the first end and is capable of communicating with the fluid chamber, at least one fluid passageway that projects outwardly from the bore to fluidly expose the bore at a point spaced between the ends, an outer sealing surface that is configured to sealingly engage the valve assembly between said point and the first end; and
a rupture disk adjacent the first end of the body, with the disk being configured to prevent fluid from flowing through the bore until the disk is ruptured.

28. A rupture disk apparatus as claimed in claim 27,
said body including a polygonal shaped head adjacent the second end.

29. A rupture disk apparatus as claimed in claim 27,
said sealing surface being at least in part externally threaded.

30. A rupture disk apparatus as claimed in claim 27,
said rupture disk comprising a metallic, concavo-convex disk.

31. A rupture disk apparatus as claimed in claim 27,
said rupture disk presenting inner and outer faces, with at least one of the faces having a line of weakness formed therein.

32. A rupture disk apparatus as claimed in claim 31,
said line of weakness being a score line.

33. A rupture disk apparatus as claimed in claim 30,
said rupture disk presenting inner and outer faces, with at least one of the faces having a pair of intersecting lines of weakness formed therein.

34. A pressure responsive valve assembly comprising:
a housing having an inlet and an outlet and a valve seat therein;
an actuating unit including
    a mechanism that defines a collapsible fluid chamber,
    structure that defines a relief chamber fluidly connected to the fluid chamber, and
    a first fluid line providing selective access to the fluid chamber and a second fluid line providing selective access to the relief chamber,
said actuating unit further including a moveable pressure responsive valve member that is engageable with the valve seat, positioned to experience the pressure conditions at the inlet, and operably coupled with the mechanism to cause collapsing of the fluid chamber when the valve member moves relative to the valve seat to establish or close communication between the inlet and outlet;
a rupture disk fluidly interposed between the fluid and relief chambers so that the disk blocks flow between the chambers until being ruptured and associated with the mechanism to prevent collapsing of the fluid chamber and corresponding movement of the valve member until the valve member experiences a predetermined maximum pressure at the inlet, whereupon the valve member moves relative to the valve seat and causes the disk to rupture and the fluid chamber to collapse; and
a removable elongated body presenting opposite first and second ends,
said body including a bore that extends inwardly from the first end and is capable of communicating with the fluid chamber, at least one fluid passageway that projects outwardly from the bore to fluidly intercommunicate the bore and relief chamber at a point spaced between the first and second ends, and an outer sealing surface that is configured to sealingly engage the structure between said point and the first end,
said rupture disk being fixed to the body adjacent the first end to block flow between the chambers until being ruptured.

35. A pressure responsive valve assembly comprising:
a housing having an inlet and an outlet and a valve seat therein;
an actuating unit including a mechanism that defines a collapsible fluid chamber,
said mechanism including a cylinder and a piston slidable within the cylinder, with the piston and cylinder cooperatively defining the collapsible fluid chamber,
said actuating unit further including a moveable pressure responsive valve member that is engageable with the valve seat, positioned to experience the pressure conditions at the inlet, and operably coupled with the mechanism to cause collapsing of the fluid chamber when the valve member moves relative to the valve seat to establish or close communication between the inlet and outlet;
a rupture disk associated with the mechanism to prevent collapsing of the fluid chamber and corresponding movement of the valve member until the valve member experiences a predetermined maximum pressure at the inlet, whereupon the valve member moves relative to the valve seat and causes the disk to rupture and the fluid chamber to collapse; and
a return spring located within the cylinder and compressible upon moving of the valve member from an initial position to a position corresponding to rupture of the disk, said return spring serving to return the valve member toward the initial position thereof after rupturing of the disk.

36. A pressure responsive valve assembly comprising:
a housing having an inlet and an outlet and a valve seat therein;
an actuating unit including
    a mechanism that defines a collapsible fluid chamber,
    an actuating rod that is connected to the valve member and projects outwardly from the housing, and
    a linkage assembly operatively coupled between the actuating rod outside the housing and the mechanism,
said actuating unit further including a moveable pressure responsive valve member that is engageable with the valve seat, positioned to experience the pressure conditions at the inlet, and operably coupled with the mechanism to cause collapsing of the fluid chamber when the valve member moves relative to the valve seat to establish or close communication between the inlet and outlet; and
a rupture disk associated with the mechanism to prevent collapsing of the fluid chamber and corresponding movement of the valve member until the valve member experiences a predetermined maximum pressure at the inlet, whereupon the valve member moves relative to the valve seat and causes the disk to rupture and the fluid chamber to collapse.

37. A bypass assembly for bypassing a valve located within a primary conduit in the event of valve failure, said bypass assembly comprising:
a bypass valve comprising
    a housing having an inlet and an outlet and a valve seat therein,
    an actuating unit including
        a mechanism that defines a collapsible fluid chamber,
        structure that defines a relief chamber fluidly connected to the fluid chamber, and
        a first fluid line providing selective access to the fluid chamber and a second fluid line providing selective access to the relief chamber
    said actuating unit further including a moveable pressure responsive valve member positioned in engagement with the valve seat to normally block communication between the inlet and outlet and to experience the pressure conditions at the inlet, with the valve member being operably coupled with the mechanism to cause collapsing of the fluid chamber when the valve member moves relative to the valve seat for establishing communication between the inlet and outlet; and a rupture disk fluidly interposed between the fluid and relief chambers so that the disk blocks flow between the chambers until being ruptured and associated with the mechanism to prevent collapsing of the fluid chamber and corresponding movement of the valve member until the valve member experiences a predetermined maximum pressure at the inlet, whereupon the valve member moves away from the valve seat an amount sufficient to communicate the inlet and outlet and causes the disk to rupture and the fluid chamber to collapse; and inlet and outlet conduits respectively in communication with the primary conduit on opposite sides of the primary conduit valve and the bypass valve inlet and outlet.

38. A bypass assembly for bypassing a valve located within a primary conduit in the event of valve failure, said bypass assembly comprising:

a bypass valve comprising
   a housing having an inlet and an outlet and a valve seat therein,
   an actuating unit including a mechanism that defines a collapsible fluid chamber,
   said actuating unit further including a moveable pressure responsive valve member positioned in engagement with the valve seat to normally block communication between the inlet and outlet and to experience the pressure conditions at the inlet, with the valve member being operably coupled with the mechanism to cause collapsing of the fluid chamber when the valve member moves relative to the valve seat for establishing communication between the inlet and outlet; and
   a rupture disk associated with the mechanism to prevent collapsing of the fluid chamber and corresponding movement of the valve member until the valve member experiences a predetermined maximum pressure at the inlet, whereupon the valve member moves away from the valve seat an amount sufficient to communicate the inlet and outlet and causes the disk to rupture and the fluid chamber to collapse;

inlet and outlet conduits respectively in communication with the primary conduit on opposite sides of the primary conduit valve and the bypass valve inlet and outlet; and a return spring compressible upon movement of the valve member from an initial position to a position corresponding to rupture of the disk, said return spring serving to return the valve member toward the initial position thereof after rupture of the disk, said mechanism including a cylinder and a piston slidable within the cylinder, with the piston and cylinder cooperatively defining the collapsible fluid chamber, and said return spring being located within the cylinder.

39. A bypass assembly for bypassing a valve located within a primary conduit in the event of valve failure, said bypass assembly comprising:

a bypass valve comprising
   a housing having an inlet and an outlet and a valve seat therein,
   an actuating unit including
      a mechanism that defines a collapsible fluid chamber,
      an actuating rod that is connected to the valve member and projects outwardly from the housing, and
      a linkage assembly operatively coupled between the actuating rod outside the housing and the mechanism,
   said actuating unit further including a moveable pressure responsive valve member positioned in engagement with the valve seat to normally block communication between the inlet and outlet and to experience the pressure conditions at the inlet, with the valve member being operably coupled with the mechanism to cause collapsing of the fluid chamber when the valve member moves relative to the valve seat for establishing communication between the inlet and outlet; and
   a rupture disk associated with the mechanism to prevent collapsing of the fluid chamber and corresponding movement of the valve member until the valve member experiences a predetermined maximum pressure at the inlet, whereupon the valve member moves away from the valve seat an amount sufficient to communicate the inlet and outlet and causes the disk to rupture and the fluid chamber to collapse; and inlet and outlet conduits respectively in communication with the primary conduit on opposite sides of the primary conduit valve and the bypass valve inlet and outlet.

* * * * *